W. V. TURNER.
SAFETY CAR CONTROL EQUIPMENT.
APPLICATION FILED NOV. 7, 1918.
1,317,529. Patented Sept. 30, 1919.
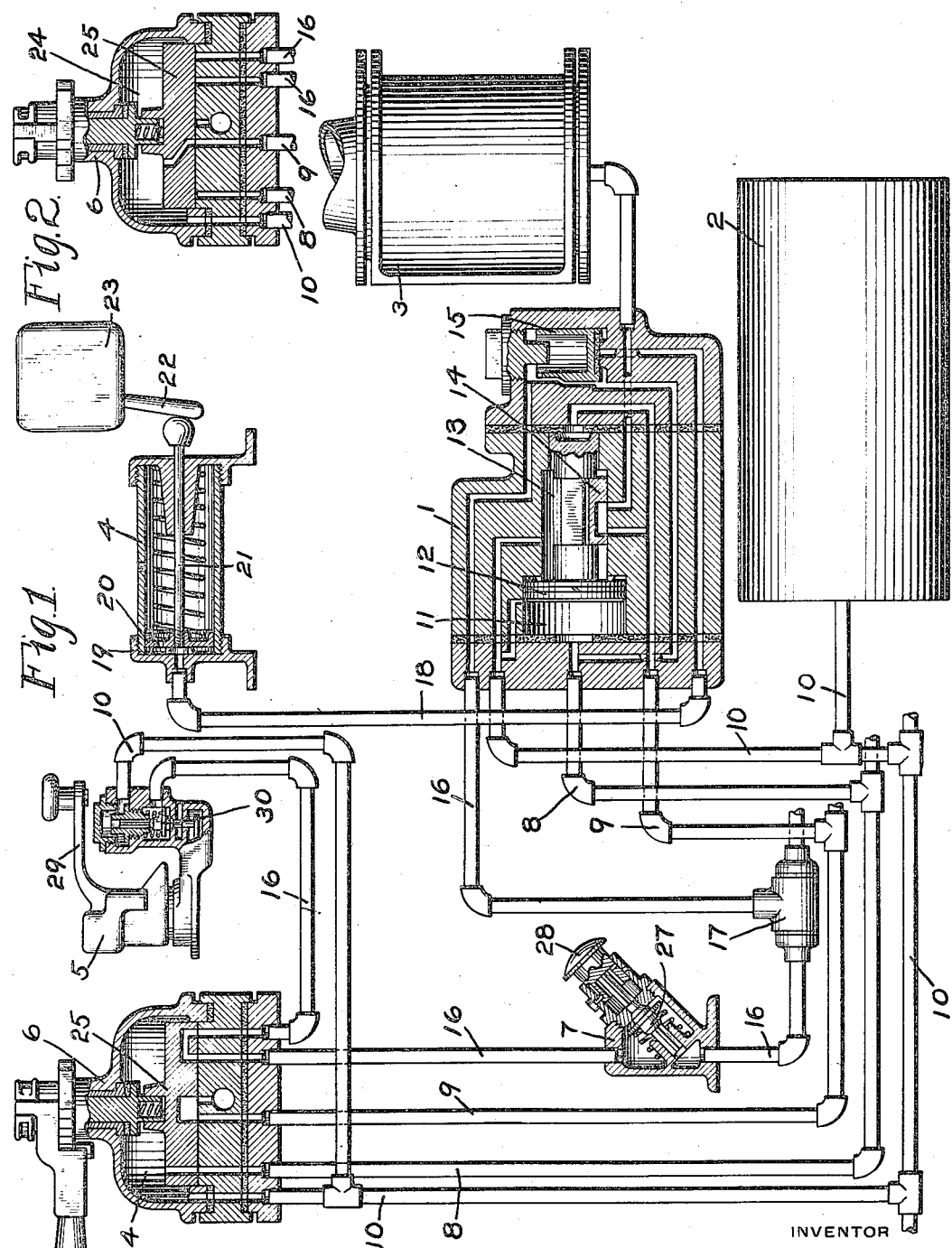
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL EQUIPMENT.

1,317,529.

Specification of Letters Patent. Patented Sept. 30, 1919.

Application filed November 7, 1918. Serial No. 261,514.

*To all whom it may concern:*

Be it known that I, WALTER V. TURNER, a citizen of the United States, residing at Wilkinsburg, in the county of Allegheny and State of Pennsylvania, have invented new and useful Improvements in Safety Car-Control Equipments, of which the following is a specification.

This invention relates to fluid pressure brakes, and more particularly to a safety car brake control equipment.

In my prior Patent No. 1,265,006, dated May 7, 1918, a safety car control equipment is disclosed, in which a pilot valve is operated upon release of the controller handle, to vent fluid for effecting an emergency application of the brakes and the cutting off of power from the car motor.

In order to permit the operator to use his hands under certain conditions, a cut-off valve is provided which is operated upon a straight air application of the brakes to cut off communication through which the pilot valve vents fluid to effect an emergency application of the brakes, so that if a straight air application of the brakes is made, the operator can remove his hand from the controller handle without causing an emergency application of the brakes.

With the above described equipment, it has been found that there is some possibility of leakage past the pilot valve, and furthermore, the operator had to hold his hand on the controller handle for a sufficient length of time to insure the movement of the cut-off valve, or run the risk of causing an emergency application if he removed his hand from the controller handle too soon.

The principal object of my present invention is to provide means for permitting the operator to remove his hand from the controller handle, upon effecting a straight air application of the brakes, without causing an emergency application of the brakes, and in which the above mentioned difficulties are obviated.

In the accompanying drawing; Figure 1 is a diagrammatic view, partly in section, of a safety car control equipment embodying my invention, and Fig. 2 a sectional view of the brake valve device, showing the rotary valve in straight air application position.

As shown in the drawing, the equipment may comprise an emergency valve device 1, a main reservoir 2, a brake cylinder 3, a circuit breaker operating device 4, a safety controller handle device 5, a brake valve device 6, a foot valve device 7, an emergency brake pipe 8, a straight air pipe 9, and a main reservoir pipe 10.

The emergency valve device 1 may comprise a casing having a piston chamber 11, connected to brake pipe 8, and containing a piston 12, and a valve chamber 13 connected to main reservoir pipe 10 and containing a slide valve 14.

The emergency valve device casing also contains a relay valve 15, having one side connected to a pipe 16, which leads past a double check valve device 17 and through foot valve device 7 to the brake valve 6.

The outer area of the opposite side of the relay valve 15 is connected to emergency brake pipe 8, while the inner seated area is connected to a pipe 18 which leads to the circuit breaker operating device 4.

The circuit breaker operating device 4 may comprise a cylinder having a piston chamber 19 connected to pipe 18 and containing a piston 20 provided with a stem 21 adapted to operate the lever 22 of the circuit breaker 23.

The brake valve device 6 may comprise the usual casing, having a valve chamber 24, containing rotary valve 25, adapted to be operated by handle 26.

The foot valve device 7 comprises a casing containing a double beat valve 27, normally adapted to provide communication through pipe 16 and operated by a foot piece 28 for closing said communication.

According to my invention, communication through the pipe 16, through which fluid is vented from the relay valve 15 to effect an emergency application of the brakes, upon opening the pilot valve 30 by the removal of the hand from the controller handle 29, is controlled by the brake valve 6 and this communication is open in all positions of the brake valve except straight air service position.

In operation, with the brake valve 6 in release position, as shown in Fig. 1 of the drawing, fluid is supplied to the emergency brake pipe 8, while fluid pressure is maintained in pipe 16, by flow from the main reservoir pipe 10, past the pilot valve 30 to pipe 16 and thence fluid flows to the top of the relay valve 15, the pilot valve exhaust being closed by the operator holding the handle 29 depressed.

If the operator removes his hand from the controller handle 29, the pilot valve 30 is operated so that fluid is vented from pipe 16 and from the top of relay valve 15. The relay valve 15 is then moved to open position, in which fluid is vented from the brake pipe 8 to pipe 18, thus operating the emergency piston 12 to effect an emergency application of the brakes.

Fluid vented by operation of the relay valve 15 flows through pipe 18 to piston chamber 19 of the circuit breaker operating device 4, actuating piston 20, so as to throw the circuit breaker lever 22, and thus cut off power to the car motor.

If desired, the operator can make a straight air service application of the brakes, by turning the brake valve to the position shown in Fig. 2 of the drawing, in which fluid is supplied to the straight air pipe 9.

It will be noted that in this position of the brake valve, the communication through pipe 16 to the pilot valve of the safety controller handle is cut off, so that while the brake valve remains in this position, the operator may remove his hand from the controller handle, without causing an emergency application of the brakes, since fluid cannot now be vented from the relay valve 15, even with the pilot valve 30 in open position.

It will also be evident that the operator may remove his hand from the controller handle immediately upon movement of the brake valve to straight air application position, without causing an emergency application of the brakes. In addition, the cut-off valve device having been dispensed with, there will be no loss of fluid by leakage.

Having now described my invention, what I claim as new, and desire to secure by Letters Patent is:—

1. In a safety car control equipment, the combination with a controller handle and a pilot valve operated by said handle for varying the fluid pressure to effect an application of the brakes, of a brake valve adapted to control communication through which said pilot valve varies the fluid pressure.

2. In a safety car control equipment, the combination with a controller handle and a pilot valve operated upon release of the controller handle for venting fluid to effect an application of the brakes, of a brake valve for controlling communication through which fluid is vented by operation of the pilot valve.

3. In a safety car control equipment, the combination with a controller handle and a pilot valve operated upon release of the controller handle for venting fluid to effect an application of the brakes, of a brake valve having a position for effecting a straight air application of the brakes and in which communication through which the pilot valve vents fluid is closed.

4. In a safety car control equipment, the combination with a controller handle and a pilot valve operated upon release of the controller handle for venting fluid to effect an application of the brakes, of a brake valve having a position in which communication for venting fluid, by operation of the pilot valve, is opened and a straight air application position, in which said communication is cut off.

5. In a safety car control equipment, the combination with a controller handle and a pilot valve operated upon release of the controller handle for venting fluid to effect an application of the brakes, of a brake valve having a straight air brake application position in which communication through which fluid is vented by operation of the pilot valve is closed, said communication being open in the other positions of the brake valve.

6. In a safety car control equipment, the combination with a brake pipe, of a device operated by fluid pressure for cutting off the power and a valve for venting fluid from the brake pipe to said device to effect an emergency application of the brakes and cut off the power.

7. In a safety car control equipment, the combination with a brake pipe, of a device operated by fluid pressure for cutting off the power, a relay valve operated by fluid pressure for venting fluid from the brake pipe to said device to effect an emergency application of the brakes and cut off the power, a controller handle, and a pilot valve operated upon release of the controller handle for varying the fluid pressure on said relay valve.

In testimony whereof I have hereunto set my hand.

WALTER V. TURNER.